US012261944B2

(12) United States Patent
Nakata

(10) Patent No.: US 12,261,944 B2
(45) Date of Patent: Mar. 25, 2025

(54) AUTHENTICATION SYSTEM AND METHOD FOR CONTROLLING AUTHENTICATION SYSTEM

(71) Applicant: KONICA MINOLTA, INC., Tokyo (JP)

(72) Inventor: Masaki Nakata, Toyohashi (JP)

(73) Assignee: KONICA MINOLTA, INC., Tokyo (JP)

( * ) Notice: Subject to any disclaimer, the term of this patent is extended or adjusted under 35 U.S.C. 154(b) by 213 days.

(21) Appl. No.: 17/748,492

(22) Filed: May 19, 2022

(65) Prior Publication Data

US 2022/0407686 A1 Dec. 22, 2022

(30) Foreign Application Priority Data

Jun. 21, 2021 (JP) ................. 2021-102559

(51) Int. Cl.
*H04L 9/08* (2006.01)

(52) U.S. Cl.
CPC .......... *H04L 9/0825* (2013.01); *H04L 9/0866* (2013.01); *H04L 9/0894* (2013.01)

(58) Field of Classification Search
None
See application file for complete search history.

(56) References Cited

U.S. PATENT DOCUMENTS

| 10,135,812 B2 * | 11/2018 | Tomita | .............. | H04N 1/4413 |
| 2014/0289837 A1 | 9/2014 | Tomita | | |
| 2022/0217000 A1 * | 7/2022 | Seaborn | .............. | H04L 9/0894 |

FOREIGN PATENT DOCUMENTS

| JP | 2010250475 A | * | 11/2010 |
| JP | 2014186602 A | | 10/2014 |

(Continued)

OTHER PUBLICATIONS

T. G. Brutch and P. C. Brutch, "Mutual Authentication, Confidentiality, and Key MANagement (MACKMAN) system for mobile computing and wireless communication," Proceedings 14th Annual Computer Security Applications Conference (Cat. No. 98EX217), Phoenix, AZ, USA, 1998, pp. 308-317 (Year: 1998).*

(Continued)

*Primary Examiner* — Bassam A Noaman
(74) *Attorney, Agent, or Firm* — Buchanan Ingersoll & Rooney PC

(57) ABSTRACT

An authentication system includes: an information processing apparatus including a first processor; and an authentication server connected to the information processing apparatus through a network and including a second processor. The first processor acquires user registration information stored in a first memory based on an instruction operation of the user, generates an authentication request including data encrypted based on an encryption key included in the acquired user registration information and identification information included in the acquired user registration information, and transmits the authentication request to the authentication server. The second processor acquires the encryption key included in the authentication registration information stored in a second memory in correspondence with the identification information included in the authentication request received from the information processing apparatus, decrypts the data encrypted based on the acquired encryption key and transmits an authentication result to the information processing apparatus.

10 Claims, 17 Drawing Sheets

(56) References Cited

FOREIGN PATENT DOCUMENTS

JP          2019-96938 A        6/2019
JP          2019193100 A   *  10/2019   ........... B64C 39/024

OTHER PUBLICATIONS

X. Feng, Z. Tang and Y. Yu, "An Efficient Contents Sharing Method for DRM," 2009 6th IEEE Consumer Communications and Networking Conference, Las Vegas, NV, USA, 2009, pp. 1-5 (Year: 2009).*

Pradeep B. H., Sanjay Singh, "Privacy Preserving and Ownership Authentication in Ubiquitous Computing Devices using Secure Three Way Authentication," 2012 International Conference on Innovations in Information Technology (IIT), Abu Dhabi, United Arab Emirates, 2012, pp. 107-112 (Year: 2012).*

Notice of Reasons for Refusal issued on Jan. 21, 2025, by the Japanese Patent Office in corresponding Japanese Patent Application No. 2021-102559, with English Translation. (11 pages).

* cited by examiner

FIG.7

| CARD ID | USER ID | ENCRYPTION KEY | TEMPORARY KEY |
|---|---|---|---|
| 0001 | AAA | EKey0001 | OTP1 |
| 0007 | BBB | EKey0007 | OTP7 |
| 0024 | CCC | EKey0024 | OTP24 |
| 0581 | DDD | EKey0581 | OTP581 |
| 0005 | EEE | EKey0005 | OTP5 |
| ... | ... | ... | ... |

FIG.8

| USER ID | ENCRYPTION KEY | TEMPORARY KEY |
|---------|----------------|---------------|
| AAA | DKey0001 | OTP1 |
| BBB | DKey0007 | OTP7 |
| CCC | DKey0024 | OTP24 |
| DDD | DKey0581 | OTP581 |
| EEE | DKey0005 | OTP5 |
| ... | ... | ... |

FIG.11

| CARD ID | USER ID | ENCRYPTION KEY | TEMPORARY KEY | PRODUCTION DATE |
|---------|---------|----------------|---------------|-----------------|
| 0001 | AAA | EKey0001 | OTP1 | XA |
| 0007 | BBB | EKey0007 | OTP7 | XB |
| 0024 | CCC | EKey0024 | OTP24 | XC |
| 0581 | DDD | EKey0581 | OTP581 | XD |
| 0005 | EEE | EKey0005 | OTP5 | XE |
| ... | ... | ... | ... | ... |

FIG.14

| CARD ID | USER ID | PASSWORD | ENCRYPTION KEY |
|---------|---------|----------|----------------|
| 0001    | AAA     | PW1      | EKey0001       |
| 0007    | BBB     | PW7      | EKey0007       |
| 0024    | CCC     | PW24     | EKey0024       |
| 0581    | DDD     | PW581    | EKey0581       |
| 0005    | EEE     | PW5      | EKey0005       |
| ...     | ...     | ...      | ...            |

FIG.15

| USER ID | PASSWORD | ENCRYPTION KEY |
|---------|----------|----------------|
| AAA | PW1 | DKey0001 |
| BBB | PW7 | DKey0007 |
| CCC | PW24 | DKey0024 |
| DDD | PW581 | DKey0581 |
| EEE | PW5 | DKey0005 |
| ... | ... | ... |

AUTHENTICATION SYSTEM AND METHOD FOR CONTROLLING AUTHENTICATION SYSTEM

The entire disclosure of Japanese Application No. 2021-102559, filed on Jun. 21, 2021, is incorporated herein by reference in its entirety.

BACKGROUND

Technological Field

The present disclosure relates to an authentication system, and particularly to a technique of authenticating a user who uses an information processing apparatus.

Description of the Related Art

Conventionally, user authentication of a user who uses an information processing apparatus is generally performed based on a user ID and a password that are input by the user to an operation panel. However, because an operation of manually inputting the user ID and the password to an operation panel is complicated, in recent years, sometimes the user authentication may be performed by reading card information from an IC card possessed by the user or the user authentication may be performed by reading biological information such as a fingerprint pattern or a vein pattern indicating the body feature of the user oneself. These authentication methods are excellent in operability because the user does not need to manually operate the operation panel to input a character string or the like. For example, Japanese Laid-Open Patent Publication No. 2014-186602 discloses the technique.

On the other hand, when an authentication server is installed on a cloud to perform the user authentication, basic information to be collated during the user authentication, namely, the user ID, the password, the card information, the biological information, and the like related to an authorized user need to be previously registered in the authentication server. However, when these pieces of information are stored in the authentication server installed on a public cloud, a security problem such as information leakage is generated.

Because the password including the character string can be appropriately changed by the user oneself, even when the password is leaked from the authentication server on the cloud, the leaked password can be prevented from being illegally used by changing the password to a new password. However, the card information recorded in the IC card or the biological information indicating the physical feature of the user oneself is not easily changeable by the user oneself. In particular, the biological information is information that cannot be changed. For this reason, when the card information or the biological information is leaked from the authentication server on the cloud, there is a problem in that unauthorized use of the leaked card information or biological information cannot be easily prevented.

SUMMARY

The present disclosure has been made to solve the above problems, and an object of the present disclosure is to provide an authentication system and a method for controlling the authentication system capable of performing secure authentication as authentication processing in the authentication server provided on the network.

To achieve at least one of the abovementioned objects, according to an aspect of the present invention, an authentication system reflecting one aspect of the present invention comprises: an information processing apparatus including a first processor; and an authentication server connected to the information processing apparatus through a network and including a second processor. The information processing apparatus includes a first memory that stores user registration information in which identification information identifying a user is associated with an encryption key set for each user. The first processor is configured to: acquire the user registration information stored in the first memory based on an instruction operation of the user; generate an authentication request including data encrypted based on an encryption key included in the acquired user registration information and the identification information included in the acquired user registration information; and transmit the authentication request to the authentication server. The authentication server includes a second memory that stores authentication registration information in which the identification information identifying the user registered in the information processing apparatus is associated with the encryption key set for each user. The second processor is configured to: acquire the encryption key included in the authentication registration information in correspondence with the identification information included in the authentication request received from the information processing apparatus; decrypt the data encrypted based on the acquired encryption key; and transmit an authentication result to the information processing apparatus.

Preferably the information processing apparatus further includes a card reader that acquires card information about a card possessed by a user, and the first processor acquires the user registration information stored in the first memory based on the card information acquired based on an instruction operation of the user to the card reader.

Preferably, the information processing apparatus further includes a sensor that acquires biological information about the user, and the first processor acquires the user registration information stored in the first memory based on the biological information acquired based on an instruction operation of the user to the sensor.

Preferably, the first processor acquires the user registration information stored in the first memory based on an input instruction operation of a code of the user.

Preferably, the information processing apparatus further includes a communication interface that receives the authentication result, and the first processor switches the information processing apparatus to a login state based on the authentication result received by the communication interface.

Preferably, the first processor registers the user registration information in the first memory for each user, and the second processor registers the authentication registration information in the second memory for each user.

Preferably, the first processor accepts a registration request including the identification information about the user and transmits the registration request to the authentication server, the second processor accepts the registration request, generates temporary information, and transmits the temporary information to the information processing apparatus, the first processor receives the temporary information to generate the encryption key for each user, and encrypts the temporary information based on the encryption key, and transmits the encrypted temporary information to the authentication server together with the encryption key, and the second processor decrypts the data encrypted based on the encryption key, and registers the authentication registration information in which the identification information and the encryption key are associated with each other based on a decryption result in the second memory.

Preferably, the first processor generates a private key paired with a public key as the encryption key, encrypts the temporary information based on the private key, and transmits the encrypted temporary information to the authentication server together with the public key, and the second processor decrypts the encrypted temporary information based on the public key, and registers the authentication registration information in which the identification information and the public key are associated with each other based on the decryption result in the second memory.

Preferably, an expiration date may be set to the encryption key.

Preferably, the first processor registers the user registration information in the first memory for each user, determines whether the encryption key included in the user registration information is within an expiration date, and re-registers the user registration information in the first memory for each user based on a determination result.

A method is provided for controlling an authentication system of the present disclosure including an information processing apparatus and an authentication server connected to the information processing apparatus through a network, the method comprising: storing user registration information in which identification information identifying a user is associated with an encryption key set for each user; acquiring the user registration information stored in the first memory based on an instruction operation of the user; generating an authentication request including data encrypted based on an encryption key included in the acquired user registration information and the identification information included in the acquired user registration information, and transmitting the authentication request to the authentication server; storing authentication registration information in which the identification information identifying the user registered in the information processing apparatus is associated with the encryption key set for each user; acquiring the encryption key included in the authentication registration information in correspondence with the identification information included in the authentication request received from the information processing apparatus; and decrypting the data encrypted based on the acquired encryption key and transmitting an authentication result to the information processing apparatus.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

FIG. 7 is a view illustrating user registration information stored in a user registration information storage 38 of the embodiment.

FIG. 8 is a view illustrating authentication registration information stored in an authentication registration information storage 108 of the embodiment.

FIG. 11 is a view illustrating user registration information stored in the user registration information storage 38 according to a modification of the embodiment.

FIG. 14 is a view illustrating user registration information stored in the user registration information storage 38 of another embodiment.

FIG. 15 is a view illustrating authentication registration information stored in the authentication registration information storage 108 of another embodiment.

DETAILED DESCRIPTION OF EMBODIMENTS

Figure 1:
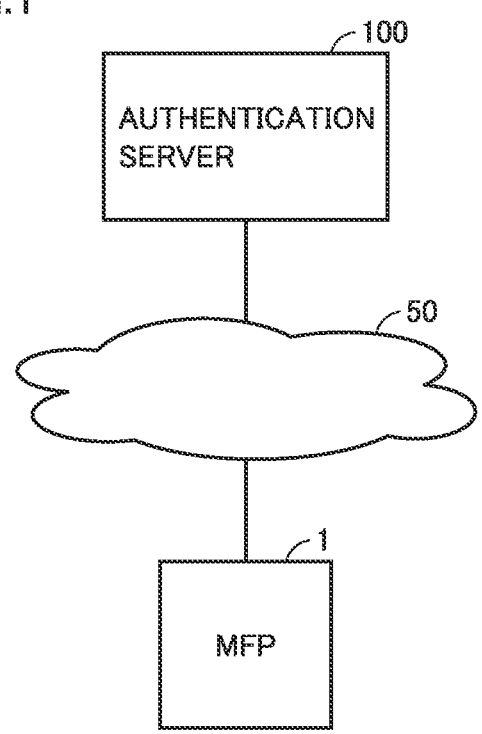
FIG. 1 is a view illustrating a configuration of an authentication system according to an embodiment.

Hereinafter, one or more embodiments of the present invention will be described with reference to the drawings. However, the scope of the invention is not limited to the disclosed embodiments. In the following description, the same component is denoted by the same reference numeral. Those names and functions are the same. Accordingly, the detailed description thereof will not be repeated.

In the following embodiment, an MFP, a printer, a copier, and a facsimile, and the like can be cited as examples of an image forming apparatus that is one type of an information processing apparatus.

FIG. 1 is a view illustrating a configuration of an authentication system according to an embodiment.

With reference to FIG. 1, the authentication system of the embodiment includes an authentication server 100, a network 50, and a multi functional peripheral (MFP) 1 that is the information processing apparatus. MFP 1 is communicably provided with authentication server 100 through network 50, and performs the authentication processing by exchanging data with authentication server 100.

Figure 2:
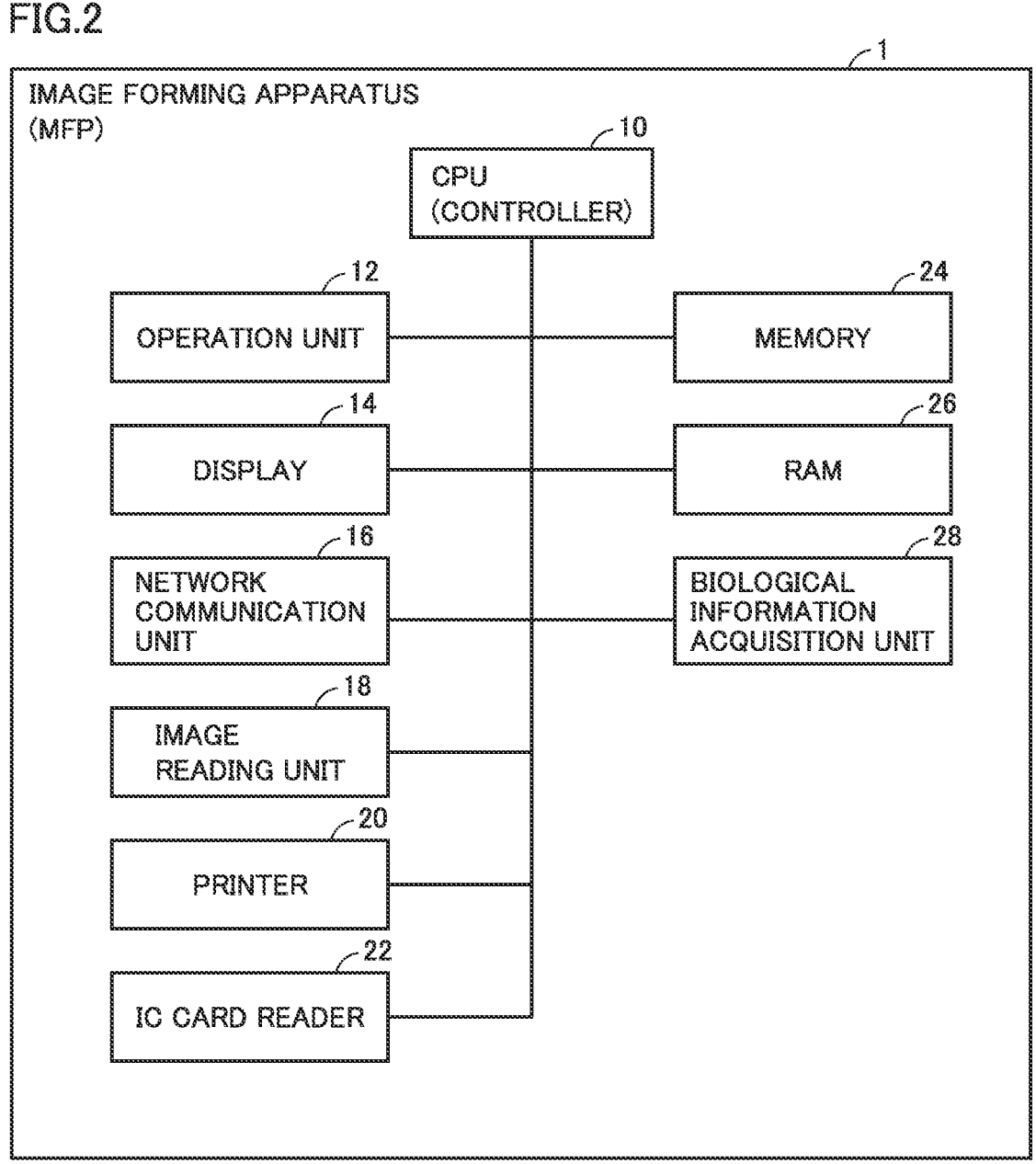
FIG. 2 is a view illustrating a configuration of an image forming apparatus (MP) 1 that is a type of information processing apparatus of the embodiment.

FIG. 2 is a view illustrating a configuration of an image forming apparatus (MFP) 1 that is a type of information processing apparatus of the embodiment. With reference to FIG. 2, image forming apparatus (MFP) 1 has a plurality of functions such as a copy function and a scan function, and can transmit and receive various data in addition to document data and image data through network 50.

Image forming apparatus 1 includes a CPU (controller) 10, an operation unit 12, a display 14, a network communication unit 16, an image reading unit 18, a printer 20, an IC card reader 22, a memory 24, a RAM 26, and a biological information acquisition unit (sensor) 28.

Operation unit 12 includes a touch panel and an operation key.

Display 14 is a display that displays information, and may be configured by combining a touch panel.

An antenna (not illustrated), a wireless module, and the like are connected to network communication unit 16 (communication interface). Image forming apparatus 1 exchanges data with an external communication device through the antenna or the wireless module. For example, the external communication device includes a portable communication terminal such as a smartphone, and an authentication server 100. Image forming apparatus 1 may be configured to be able to download required information from authentication server 100 through the antenna.

Image reading unit 18 is a scanner and can acquire image data.

Printer 20 can print the acquired image data on a recording sheet.

Image forming apparatus 1 includes an authentication information acquisition device that acquires authentication information. Image forming apparatus 1 of the present disclosure includes two devices of IC card reader 22 and biological information acquisition unit 28 as authentication information acquisition devices. IC card reader 22 reads recorded information (card information) recorded in a recording medium from a portable IC card (portable recording medium) in which a computer-readable recording medium possessed by each user is built-in, thereby the acquiring the user-specific authentication information.

Furthermore, for example, biological information acquisition unit 28 reads a fingerprint pattern or a vein pattern of a fingertip, which is the physical feature of the user, as the biological information, and acquires the biological information as the authentication information unique to the user. However, the biological information acquired by biological information acquisition unit 28 is not necessarily limited to the fingerprint pattern or the vein pattern, but may be another piece of biological information. For example, a voiceprint, an iris, a face image, or the like of the user may be acquired as the biological information.

In using image forming apparatus 1, an input operation is performed on operation unit 12, the user ID and the password including the character string greater than or equal to a predetermined number of characters can be manually input to instruct image forming apparatus 1 to start the user authentication. In addition, when it is troublesome to perform the manual operation on operation unit 12, the user sets the IC card carried by the user oneself at a position where IC card reader 22 can read the IC card, or sets the fingertip of the user at a reading position of biological information acquisition unit 28, so that the authentication information can be automatically acquired by the authentication information acquisition devices to instruct the start of the user authentication. When the user authentication is successful and when image forming apparatus 1 enters the login state, the user can perform various input operations such as a job setting operation and a job execution instruction on operation unit 12.

CPU 10 controls the operation of image forming apparatus 1 by executing various programs of image forming apparatus 1. CPU 10 reads the program from memory 24 in RAM 26 based on the reception of the execution instruction of the program. RAM 26 functions as a working memory, and temporarily stores various data required for the execution of the program.

For example, memory 24 is a hard disk, a solid state drive (SSD), or another storage device. Memory 24 may be either a built-in type or an external type. Memory 24 stores the program of the embodiment and the like. A storage location of the program is not limited to memory 24, but may be stored in a ROM, a RAM, an external device (for example, a server), or the like. The program may be provided as a part of an arbitrary program instead of as a stand-alone program. In this case, the control processing of the embodiment is implemented in cooperation with an arbitrary program. Even a program that does not include such a part of modules does not deviate from the purpose of the program of the embodiment. Furthermore, some or all of the functions provided by the program may be implemented by dedicated hardware. Furthermore, image forming apparatus 1 may be configured in a form of what is called cloud service in which at least one server executes a part of the processing of the program.

Figure 3:
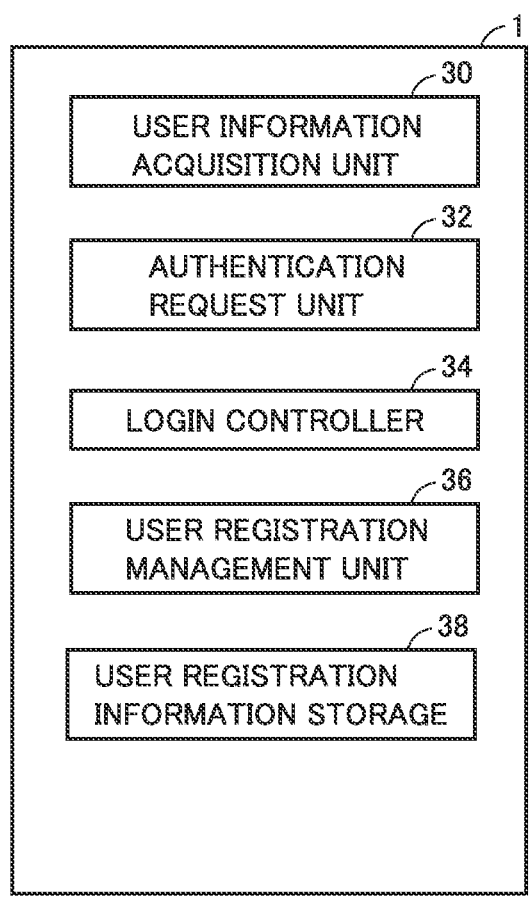
FIG. 3 is a view illustrating a functional block of the image forming apparatus 1 of the embodiment.

FIG. 3 is a view illustrating a functional block of the image forming apparatus 1 of the embodiment. With reference to FIG. 3, image forming apparatus 1 implements various functional blocks by CPU 10 executing the program stored in memory 24.

Image forming apparatus 1 includes a user information acquisition unit 30, an authentication request unit 32, a login controller 34, a user registration management unit 36, and a user registration information storage 38.

User registration information storage 38 stores the user registration information in which the identification information identifying the user is associated with the encryption key set for each user.

User information acquisition unit 30 acquires the user registration information stored in user registration information storage 38 based on the instruction operation of the user. User information acquisition unit 30 acquires the user registration information stored in user registration information storage 38 based on the card information acquired based on the instruction operation of the user to IC card reader 22. User information acquisition unit 30 may acquire the user registration information stored in user registration information storage 38 based on the biological information acquired based on the instruction operation of the user to biological information acquisition unit 28. User information acquisition unit 30 may acquire the user registration information stored in user registration information storage 38 based on the code input instruction operation of the user.

Authentication request unit 32 generates the authentication request including data encrypted based on the encryption key included in the acquired user registration information, and transmits the authentication request to authentication server 100.

Login controller 34 switches image forming apparatus 1 to the login state based on the authentication result received from authentication server 100 through network communication unit 16.

User registration management unit 36 registers the user registration information for each user in user registration information storage 38. User registration management unit 36 receives the registration request including the identification information of the user, and transmits the registration request to authentication server 100. User registration management unit 36 receives the temporary information from authentication server 100 through network communication unit 16, and generates the encryption key for each user. User registration management unit 36 encrypts the temporary information based on the encryption key, and transmits the encrypted temporary information to authentication server 100 together with the generated encryption key.

User registration management unit 36 may generate a private key paired with a public key as the encryption key. User registration management unit 36 may encrypt the temporary information based on the private key, and transmit the encrypted temporary information to authentication server 100 together with the public key. An expiration date may be set to the encryption key.

User registration management unit 36 may determine whether the encryption key included in the user registration information is within the expiration date, and re-register the user registration information in user registration information storage 38 for each user based on the determination result.

Figure 4:
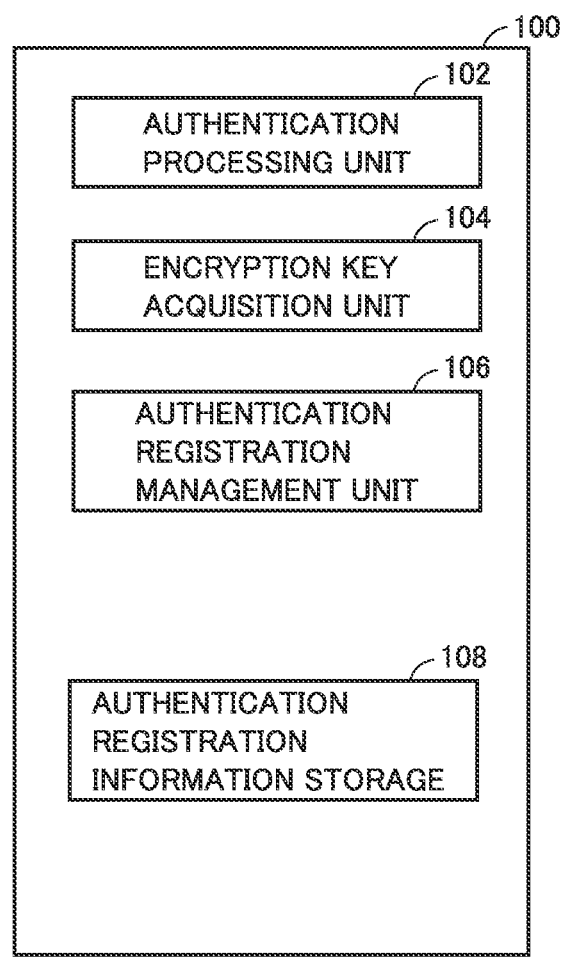
FIG. 4 is a view illustrating a functional block of an authentication server 100 of the embodiment.

FIG. 4 is a view illustrating a functional block of an authentication server 100 of the embodiment. With reference to FIG. 4, authentication server 100 includes an authentication processing unit 102, an encryption key acquisition unit 104, an authentication registration management unit 106, and an authentication registration information storage 108.

Authentication registration information storage 108 stores the authentication registration information in which the identification information identifying the user registered in image forming apparatus 1 is associated with the encryption key set for each user.

Encryption key acquisition unit 104 acquires the encryption key included in the authentication registration information in response to the identification information included in the authentication request received from image forming apparatus 1.

Authentication processing unit 102 decrypts data encrypted based on the acquired encryption key, and transmits an authentication result to image forming apparatus 1.

Authentication registration management unit 106 registers the authentication registration information for each user in authentication registration information storage 108. Authentication registration management unit 106 receives the registration request, generates the temporary information, and transmits the temporary information to image forming apparatus 1. Authentication registration management unit 106 decrypts the data encrypted based on the encryption key, and registers the authentication registration information in which the identification information and the encryption key are associated with each other in the authentication registration information storage 108 based on the decryption result. Authentication registration management unit 106 may decrypt the encrypted temporary information based on the public key, and register the authentication registration information in which the identification information and the public key are associated with each other in the authentication registration information storage 108 based on the decryption result.

Figure 5:
FIG. 5 is a view illustrating an example of a display screen of a display 14 of the embodiment.

FIG. 5 is a view illustrating an example of a display screen of a display 14 of the embodiment. With reference to FIG. 5, a screen 200 is illustrated. In the example, "Please touch IC card." is displayed. When executing login, the user can set the IC card at a readable position of IC card reader 22 according to screen 200.

Figure 6:
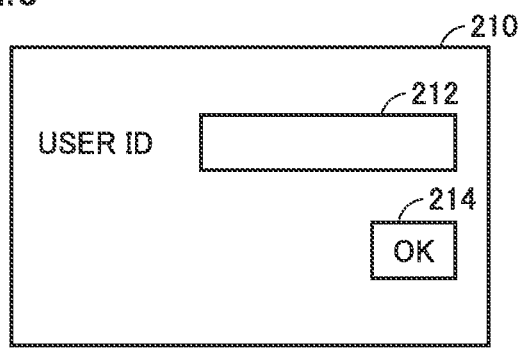
FIG. 6 is a view illustrating another example of the display screen of the display 14 of the embodiment.

FIG. 6 is a view illustrating another example of the display screen of the display 14 of the embodiment. With reference to FIG. 6, a user ID registration screen 210 is illustrated. In the example, an input field 212 in which the user ID is input is provided. In addition, an "OK" button 214 is provided.

When the user registration information is not registered in user registration information storage 38, the processing for registering the user registration information can be executed in order to input the user ID on user ID registration screen 210.

FIG. 7 is a view illustrating user registration information stored in a user registration information storage 38 of the embodiment. With reference to FIG. 7, in the example, the user ID, the encryption key, and the temporary key are registered in association with the card ID.

As an example, a user ID "AAA", an encryption key "Ekey0001", and a temporary key "OTP1" are registered in association with a card ID "0001". A user ID "BBB", an encryption key "Ekey0007", and a temporary key "OTP7" are registered in association with a card ID "0007". A user ID "CCC", an encryption key "Ekey0024", and a temporary key "OTP24" are registered in association with a card ID "0024". A user ID "DDD", an encryption key "Ekey0581", and a temporary key "OTP581" are registered in association with a card ID "0581". A user ID "EEE", an encryption key "Ekey0005", and a temporary key "OTP5" are registered in association with a card ID "0005". The same applies to other pieces of user registration information.

FIG. 8 is a view illustrating authentication registration information stored in an authentication registration information storage 108 of the embodiment. With reference to FIG. 8, in the example, an encryption key "Dkey0001" and the temporary key "OTP1" are registered in association with the user ID "AAA". An encryption key "Dkey0007" and the temporary key "OTP7" are registered in association with the user ID "BBB". An encryption key "Dkey0024" and the temporary key "OTP24" are registered in association with the user ID "CCC". An encryption key "Dkey0581" and the temporary key "OTP581" are registered in association with the user ID "DDD". An encryption key "Dkey0005" and the temporary key "OTP5" are registered in association with the user ID "EEE". The same applies to other pieces of user registration information.

Figure 9:
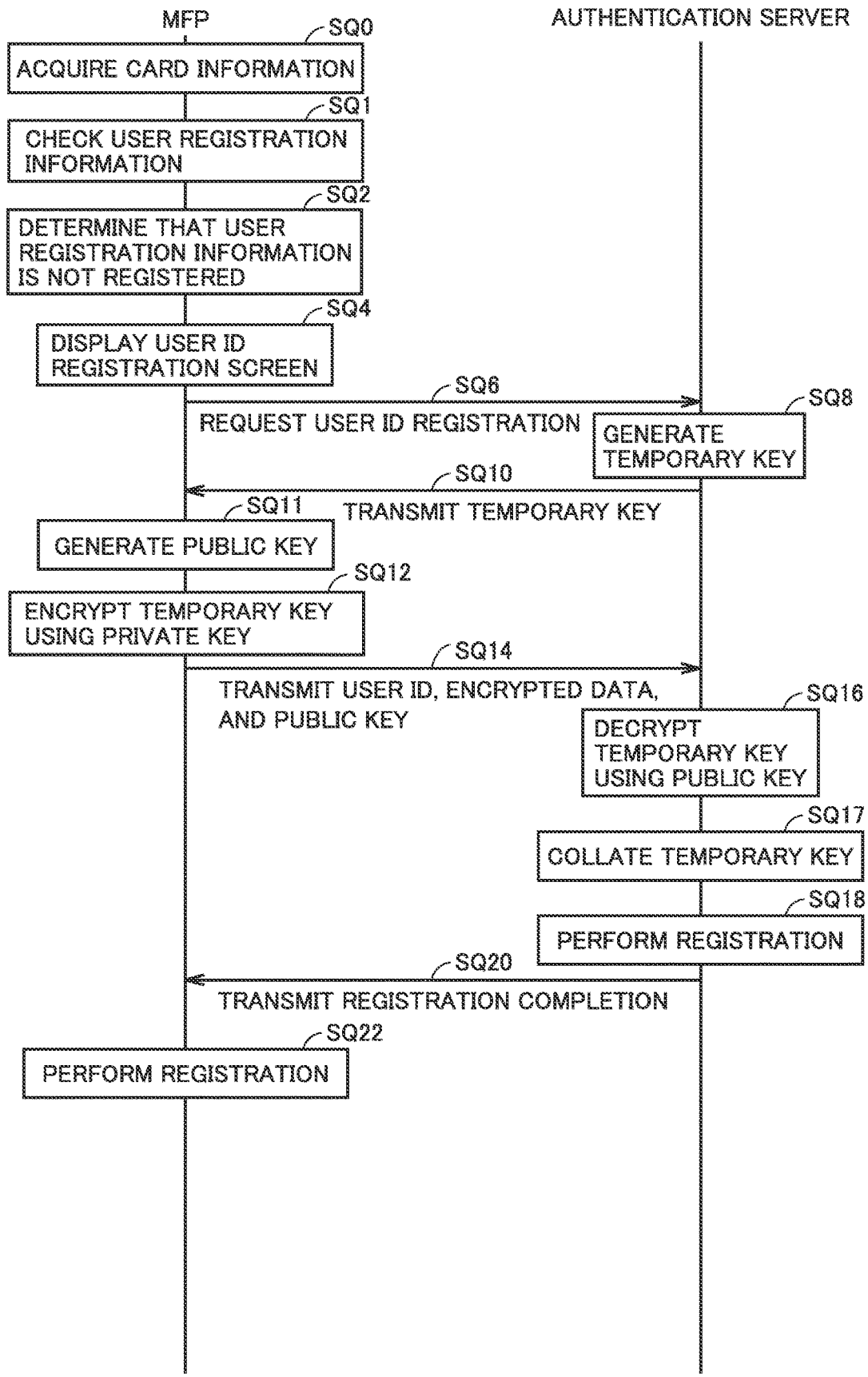
FIG. 9 is a view illustrating a data transfer flow during registration processing between the image forming apparatus 1 and the authentication server 100 of the embodiment.

FIG. 9 is a view illustrating a data transfer flow during registration processing between the image forming apparatus 1 and the authentication server 100 of the embodiment. In the example, the case where the user having the IC card does not perform the user registration will be described.

With reference to FIG. 9, IC card reader 22 acquires card information (sequence SQ0). User information acquisition unit 30 checks whether the user registration information stored in user registration information storage 38 can be acquired according to the card ID acquired through IC card reader 22 (sequence SQ1). In this example, the case where the user registration information is not registered in user registration information storage 38 according to the acquired card information is illustrated in user information acquisition unit 30 (sequence SQ2). When determining that the user registration information cannot be acquired, user information acquisition unit 30 instructs user registration management unit 36. User registration management unit 36 displays the user ID registration screen (sequence SQ4).

User registration management unit 36 transmits a registration request of the user ID to authentication server 100 according to the input of the user ID on user ID registration screen 210 (sequence SQ6).

Subsequently, authentication registration management unit 106 receives the registration request of the user ID from image forming apparatus 1, and generates the temporary key (sequence SQ8).

Subsequently, authentication registration management unit 106 transmits the generated temporary key to image forming apparatus 1 (sequence SQ10).

User registration management unit 36 receives the temporary key from authentication server 100, and generates a public encryption key (sequence SQ11). The public encryption key includes the private key and the public key.

Subsequently, user registration management unit 36 encrypts the temporary key using the generated private key of the public encryption key (sequence SQ12).

User registration management unit 36 transmits the user ID, the encrypted data, and the public key to authentication server 100. The encrypted data is obtained by encrypting the temporary key using the private key.

Authentication registration management unit 106 receives the user ID, the encrypted data, and the public key to authentication server 100, and decrypts the encrypted data with the public key (sequence SQ16).

Authentication registration management unit 106 collates whether the decrypted temporary key and the transmitted temporary key are the same (sequence SQ17).

When determining that the collation results are matched with each other, authentication registration management unit 106 registers the authentication registration information in authentication registration information storage 108 (sequence SQ18).

Authentication registration management unit 106 transmits a registration completion notification to image forming apparatus 1 (sequence SQ20).

When receiving the registration completion notification from authentication server 100, user registration management unit 36 receives the registration completion result in authentication server 100 to register the user registration information in user registration information storage 38 (sequence SQ22).

Thus, the registration processing is completed.

Figure 10:
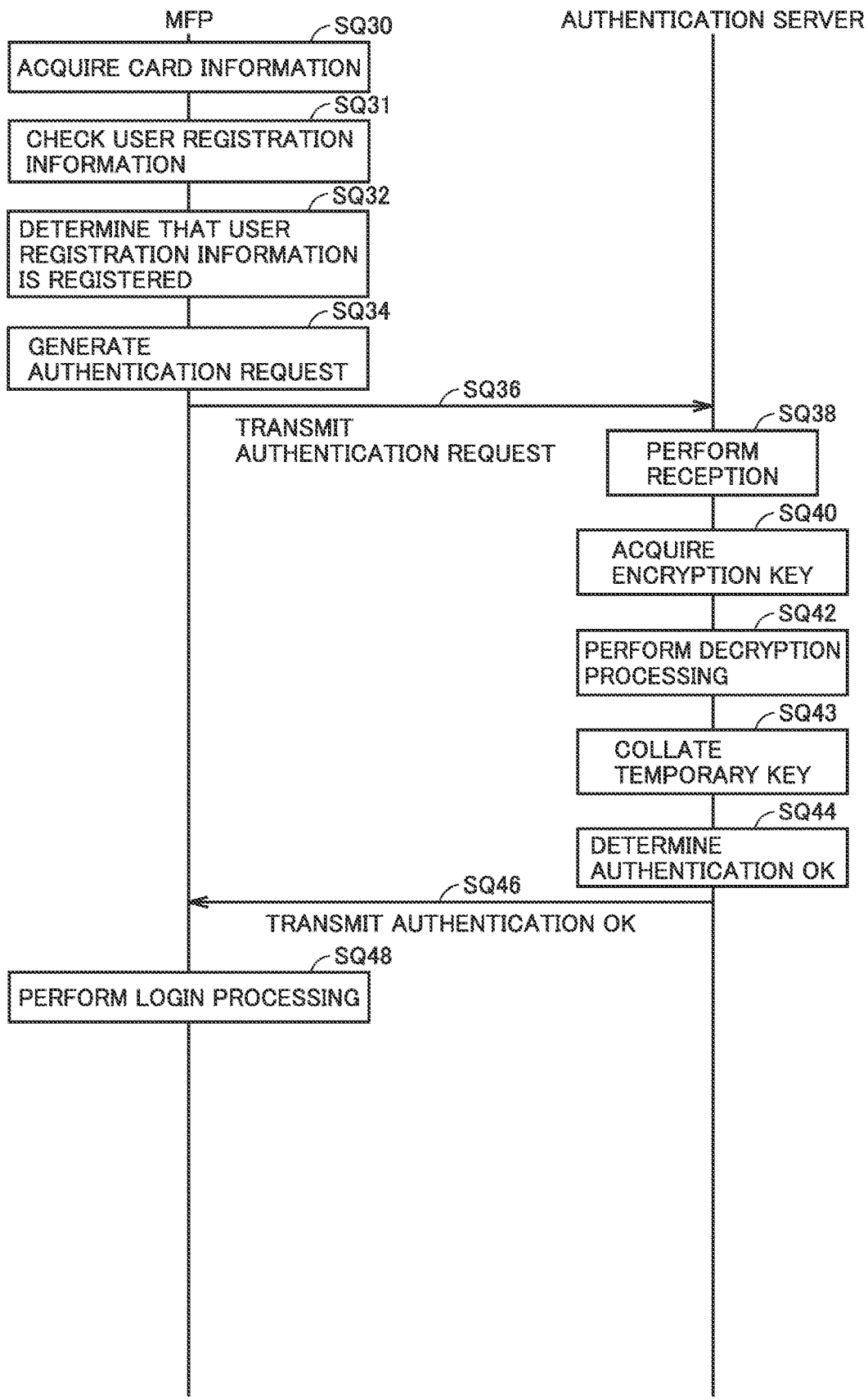
FIG. 10 is a view illustrating a data transfer flow during authentication processing between the image forming apparatus 1 and the authentication server 100 of the embodiment.

FIG. 10 is a view illustrating a data transfer flow during authentication processing between the image forming apparatus 1 and the authentication server 100 of the embodiment. In the example, the case where the user possessing the IC card is registered as the user will be described.

With reference to FIG. 10, IC card reader 22 acquires the card information (sequence SQ30). The user information acquisition unit 30 checks whether the user registration information stored in user registration information storage 38 can be acquired according to the card ID acquired through IC card reader 22 (sequence SQ31). In the example, user information acquisition unit 30 illustrates the case where the user registration information is registered in user registration information storage 38 according to the acquired card information (sequence SQ32). Subsequently, user information acquisition unit 30 instructs authentication request unit 32, and authentication request unit 32 generates the authentication request (sequence SQ34). Authentication request unit 32 transmits the user ID and the encrypted data to authentication server 100 as the authentication request. The encrypted data is obtained by encrypting the temporary key using the private key.

Subsequently, authentication processing unit 102 receives the authentication request from image forming apparatus 1 (sequence SQ38).

Subsequently, authentication processing unit 102 acquires the encryption key according to the user ID included in the authentication request (sequence SQ40). Specifically, authentication processing unit 102 acquires the public key corresponding to the user ID from the authentication registration information stored in authentication registration information storage 108.

Subsequently, authentication processing unit 102 decrypts the encrypted data based on the acquired public key (sequence SQ42).

Authentication processing unit 102 collates whether the decrypted temporary key and the temporary key included in the authentication registration information are the same (sequence SQ43).

When determining that the collation results are matched with each other, authentication processing unit 102 determines the authentication OK (sequence SQ44).

Authentication processing unit 102 transmits an authentication OK notification to image forming apparatus 1 (sequence SQ46).

When receiving the authentication OK notification from authentication server 100, authentication request unit 32 notifies the login controller 34, and login controller 34 executes the login processing (sequence SQ48). Thus, the authentication processing is completed.

According to a method of the embodiment, the encryption key is generated for each user, and the authentication processing is executed based on the generated encryption key. Consequently, the secure authentication can be performed.

Furthermore, according to this method, when the authentication processing is performed using the IC card possessed by each user, the information about the IC card is not required to be transmitted to authentication server 100, but the information about the IC card can be kept in the secure state.

In the example, the user authentication method using the IC card has been described. However, the authentication method is not limited to the IC card, but the biological information can be similarly used instead of the IC card. The biological information may be registered instead of the card ID. In addition, not only the biological information but also, for example, a user authentication method using a PIN code can be similarly applied.

(Modification)

FIG. 11 is a view illustrating user registration information stored in the user registration information storage 38 according to a modification of the embodiment. With reference to FIG. 11, in the example, the user ID, the encryption key, the temporary key, and a production date are registered in association with the card ID.

As an example, the user ID "AAA", the encryption key "Ekey0001", the temporary key "OTP1", and a production date "XA" are registered in association with the card ID "0001". The user ID "BBB", the encryption key "Ekey0007", the temporary key "OTP7", and a production date "XB" are registered in association with the card ID "0007". The user ID "CCC", the encryption key "Ekey0024", the temporary key "OTP24", and a production date "XC" are registered in association with the card ID "0024". The user ID "DDD", the encryption key "Ekey0581", the temporary key "OTP581", and a production date "XD" are registered in association with the card ID "0581". The user ID "EEE", the encryption key "Ekey0005", the temporary key "OTP5", and a production date "XE" are registered in association with the card ID "0005". The same applies to other pieces of user registration information.

In the modification of the embodiment, the production date of the encryption key is registered in association with the user registration information. The expiration date of the encryption key is set using the production date. For example, it is assumed that a predetermined period (for example, 30 days) is set as the expiration date. It is assumed that the encryption key is available within 30 days when the date on which the authentication processing is performed is compared with the production date of the encryption key. On the other hand, when 30 days passes, the use of the encryption key is set to be invalid.

When the use of the encryption key is invalid, image forming apparatus 1 executes the re-registration processing of the user registration information.

Figure 12:
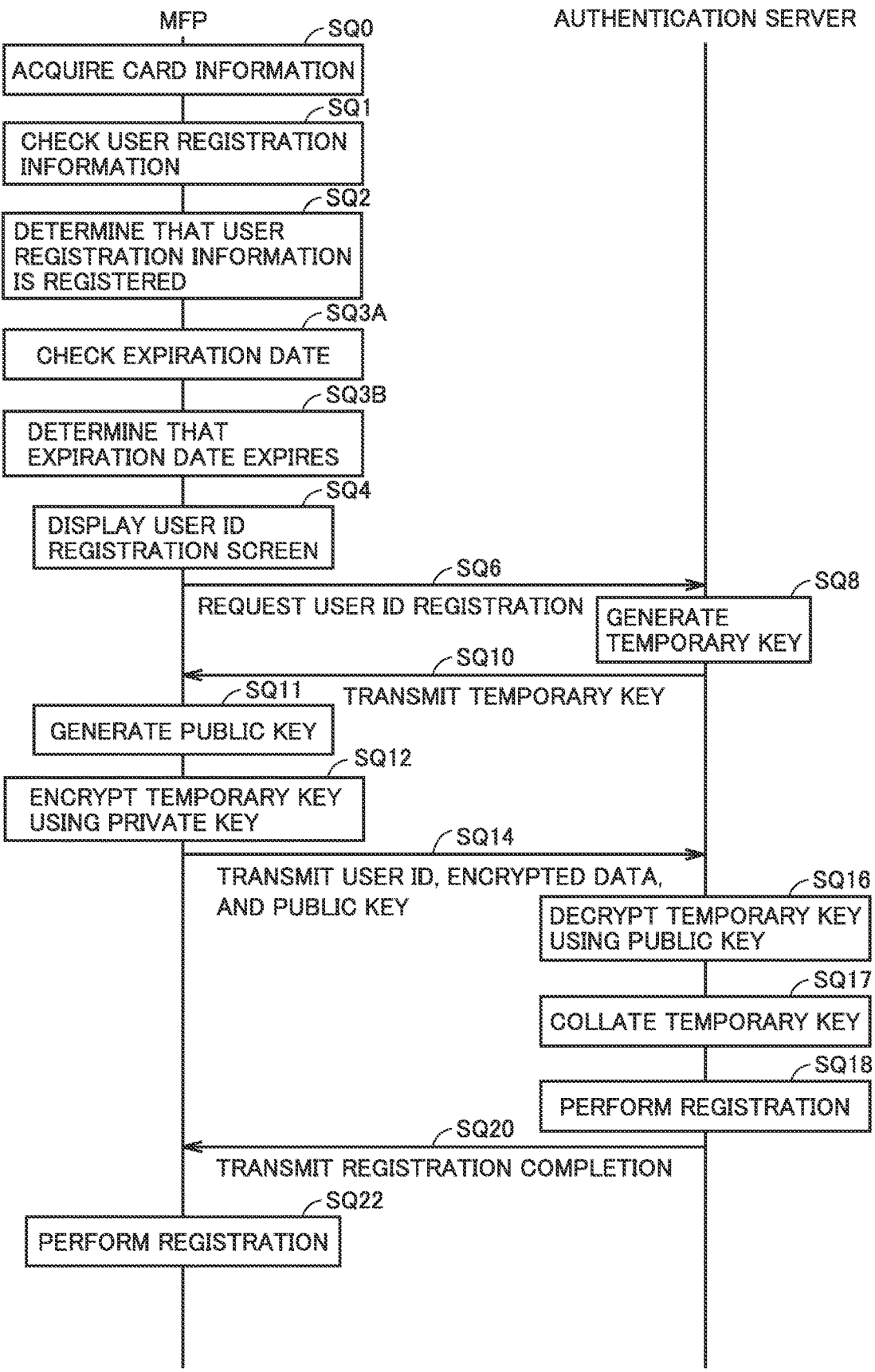
FIG. 12 is a view illustrating a data transfer flow during re-registration processing between the image forming apparatus 1 and the authentication server 100 of the modification of the embodiment.

FIG. 12 is a view illustrating a data transfer flow during re-registration processing between the image forming apparatus 1 and the authentication server 100 of the modification of the embodiment. In the example, the case where the user possessing the IC card performs the user registration and the expiration date of the encryption key is expired will be described.

With reference to FIG. 12, IC card reader 22 acquires the card information (sequence SQ0). User information acquisition unit 30 checks whether the user registration information stored in user registration information storage 38 can be acquired according to the card ID acquired through IC card reader 22 (sequence SQ1). In the example, user information acquisition unit 30 illustrates the case where the user registration information is registered in user registration information storage 38 according to the acquired card information (sequence SQ2). Subsequently, user information acquisition unit 30 checks the expiration date of the encryption key included in the user registration information (sequence SQ3A). User information acquisition unit 30 compares the production date of the encryption key with the date on which the authentication processing is performed with respect to the user registration information according to the acquired card information, and determines whether the expiration date is within 30 days.

User information acquisition unit 30 determines that the expiration date of the encryption key expires (sequence SQ3B). User information acquisition unit 30 compares the production date of the encryption key with the date of the authentication processing with respect to the user registration information according to the acquired card information, and determines that the production date is not within 30 days.

Subsequently, when determining the expiration date of the encryption key expires, user information acquisition unit 30 instructs user registration management unit 36. User registration management unit 36 displays the user ID registration screen (sequence SQ4). The subsequent processing is similar to that described in FIG. 9.

That is, user registration management unit 36 transmits the registration request of the user ID to authentication server 100 according to the input of the user ID on user ID registration screen 210 (sequence SQ6). Subsequently, authentication registration management unit 106 receives the registration request of the user ID from image forming apparatus 1, and generates the temporary key (sequence SQ8). Subsequently, authentication registration management unit 106 transmits the generated temporary key to image forming apparatus 1 (sequence SQ10). User registration management unit 36 receives the temporary key from authentication server 100, and generates a public encryption key (sequence SQ11). The public encryption key includes the private key and the public key. Subsequently, user registration management unit 36 encrypts the temporary key using the generated private key of the public encryption key (sequence SQ12). User registration management unit 36 transmits the user ID, the encrypted data, and the public key to authentication server 100. The encrypted data is obtained by encrypting the temporary key using the private key. Authentication registration management unit 106 receives the user ID, the encrypted data, and the public key to authentication server 100, and decrypts the encrypted data with the public key (sequence SQ16). Authentication registration management unit 106 collates whether the decrypted temporary key and the transmitted temporary key are the same (sequence SQ17). When determining that the collation results are matched with each other, authentication registration management unit 106 registers the authentication registration information in authentication registration information storage 108 (sequence SQ18). Authentication registration management unit 106 transmits a registration completion notification to image forming apparatus 1 (sequence SQ20). When receiving the registration completion notification from authentication server 100, user registration management unit 36 receives the registration completion result in authentication server 100 to register the user registration information in user registration information storage 38 (sequence SQ22).

Thus, the re-registration process is completed.

When the expiration date of the encryption key is set by the processing and when the expiration date expires, the encryption key can be regenerated by newly executing re-registration processing, and the secure authentication processing can be maintained.

In the example, the user authentication method using the IC card has been described. However, the authentication method is not limited to the IC card, but the biological information can be similarly used instead of the IC card. The biological information may be registered instead of the card ID. In addition, not only the biological information but also, for example, a user authentication method using a PIN code can be similarly applied.

(Another Embodiment)

The case of registering the user ID has been described in the above embodiment, and the case of registering the password (PW) together with the user ID will be described.

Figure 13:
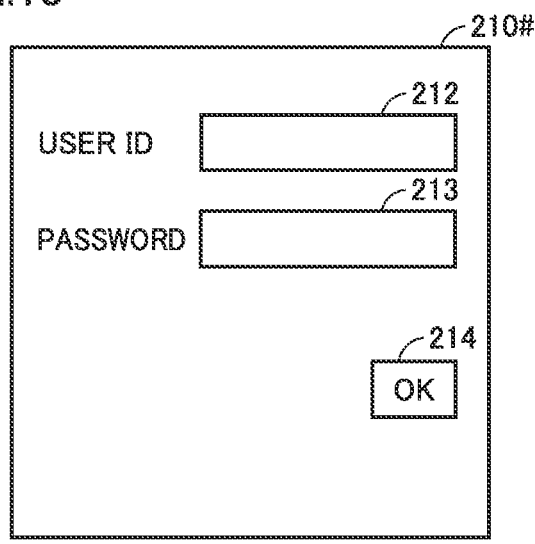
FIG. 13 is a view illustrating another example of the display screen of the display 14 according to another embodiment.

FIG. 13 is a view illustrating another example of the display screen of the display 14 according to another embodiment. With reference to FIG. 13, a user ID registration screen 210 # is illustrated. In this example, an input field 212 in which the user ID is input and an input field 213 in which the password is input are provided. In addition, an "OK" button 214 is provided.

When the user registration information is not registered in user registration information storage 38, the processing for registering the user registration information can be executed in order to input the user ID and the password on user ID registration screen 210.

FIG. 14 is a view illustrating user registration information stored in the user registration information storage 38 of another embodiment. With reference to FIG. 14, in the example, the user ID, the password, and the encryption key are registered in association with the card ID.

As an example, the user ID "AAA", a password "PW1", and the encryption key "Ekey0001" are registered in association with the card ID "0001". The user ID "BBB", a password "PW7", and the encryption key "Ekey0007" are registered in association with the card ID "0007". The user ID "CCC", a password "PW24", and the encryption key "Ekey0024" are registered in association with the card ID "0024". The user ID "DDD", a password "PW581", and the encryption key "Ekey0581" are registered in association with the card ID "0581". The user ID "EEE", a password "PW5", and the encryption key "Ekey0005" are registered in association with the card ID "0005". The same applies to other pieces of user registration information.

FIG. 15 is a view illustrating authentication registration information stored in the authentication registration information storage 108 of another embodiment. With reference to FIG. 15, in the example, the password "PW1" and the encryption key "Dkey0001" are registered in association with the user ID "AAA". The password "PW7" and the encryption key "Dkey0007" are registered in association with the user ID "BBB". The password "PW24" and the encryption key "Dkey0024" are registered in association with the user ID "CCC". The password "PW581" and the encryption key "Dkey0581" are registered in association with the user ID "DDD". The password "PW5" and the encryption key "Dkey0005" are registered in association with the user ID "EEE". The same applies to other pieces of user registration information.

Figure 16:
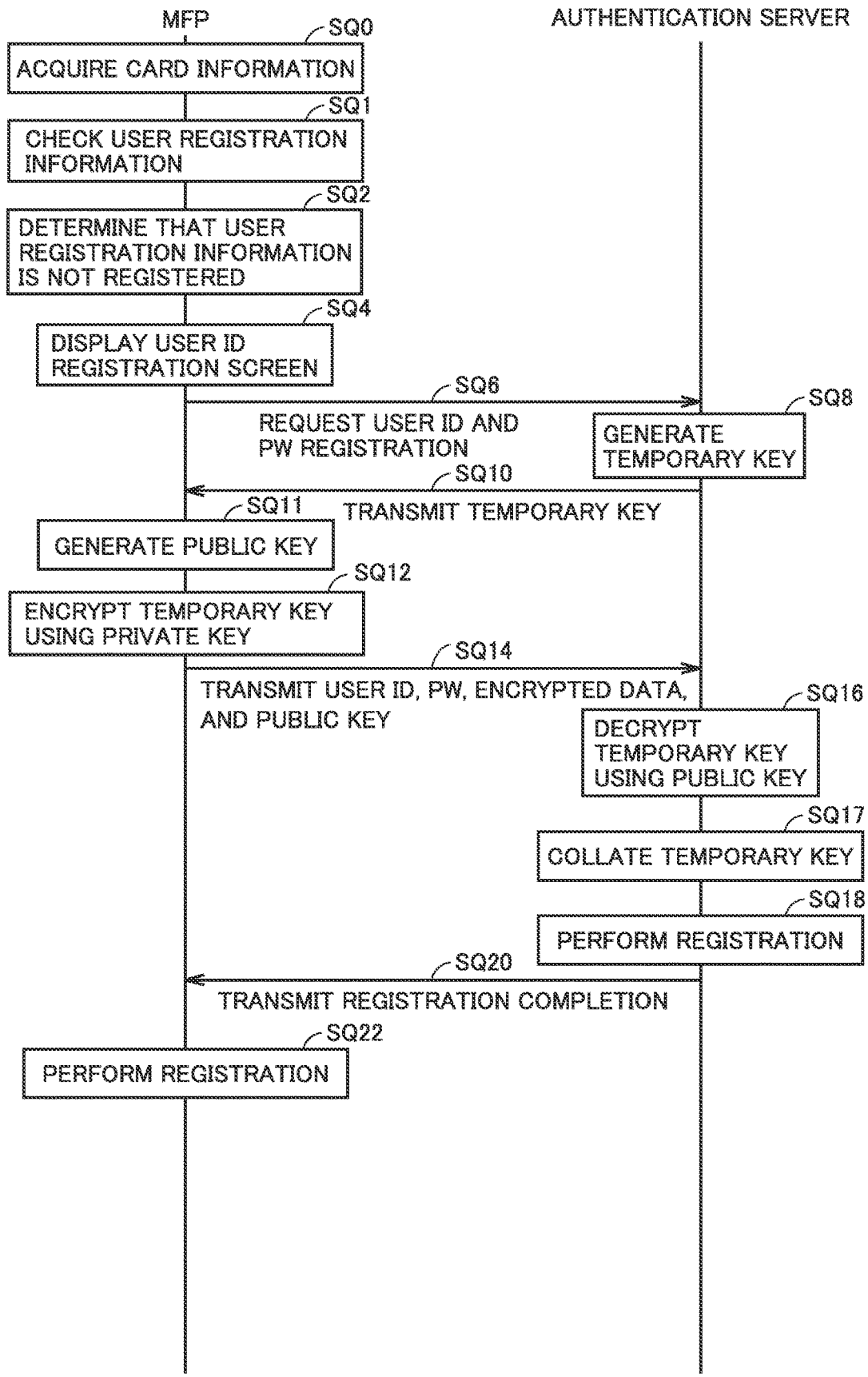
FIG. 16 is a view illustrating a data transfer flow during the registration processing between the image forming apparatus 1 and the authentication server 100 of another embodiment.

FIG. 16 is a view illustrating a data transfer flow during the registration processing between the image forming apparatus 1 and the authentication server 100 of another embodiment. In the example, the case where the user having the IC card does not perform the user registration will be described. With reference to FIG. 16, IC card reader 22 acquires the card information (sequence SQ0). User information acquisition unit 30 checks whether the user registration information stored in user registration information storage 38 can be acquired according to the card ID acquired through IC card reader 22 (sequence SQ1). In this example, the case where the user registration information is not registered in user registration information storage 38 according to the acquired card information is illustrated in user information acquisition unit 30 (sequence SQ2). When determining that the user registration information cannot be acquired, user information acquisition unit 30 instructs user registration management unit 36. User registration management unit 36 displays the user ID registration screen (sequence SQ4).

User registration management unit 36 transmits the registration request of the user ID and the password (PW) to authentication server 100 according to the input of the user ID and the password on user ID registration screen 210 (sequence SQ6).

Subsequently, authentication registration management unit 106 receives the registration request of the user ID and the password (PW) from image forming apparatus 1, and generates the temporary key (sequence SQ8).

Subsequently, authentication registration management unit 106 transmits the generated temporary key to image forming apparatus 1 (sequence SQ10).

User registration management unit 36 receives the temporary key from authentication server 100, and generates a public encryption key (sequence SQ11). The public encryption key includes the private key and the public key.

Subsequently, user registration management unit 36 encrypts the temporary key using the generated private key of the public encryption key (sequence SQ12).

User registration management unit 36 transmits the user ID, the password (PW), the encrypted data, and the public key to authentication server 100. The encrypted data is obtained by encrypting the temporary key using the private key.

Authentication registration management unit 106 receives the user ID, the password (PW), the encrypted data, and the public key to authentication server 100, and decrypts the encrypted data with the public key (sequence SQ16).

Authentication registration management unit 106 collates whether the decrypted temporary key and the transmitted temporary key are the same (sequence SQ17).

When determining that the collation results are matched with each other, authentication registration management unit 106 registers the authentication registration information in authentication registration information storage 108 (sequence SQ18). As illustrated in FIG. 15, authentication registration information storage 108 stores the authentication registration information in which the identification information (the user ID and the password) identifying the user registered in image forming apparatus 1 is associated with the encryption key (public key) set for each user.

Authentication registration management unit 106 transmits a registration completion notification to image forming apparatus 1 (sequence SQ20).

When receiving the registration completion notification from authentication server 100, user registration management unit 36 receives the registration completion result in authentication server 100 to register the user registration information in user registration information storage 38 (sequence SQ22). As illustrated in FIG. 14, user registration management unit 36 registers the user registration information in which the user ID and the password are associated with the encryption key (private key) set for each user in user registration information storage 38.

Thus, the registration processing is completed.

Figure 17:
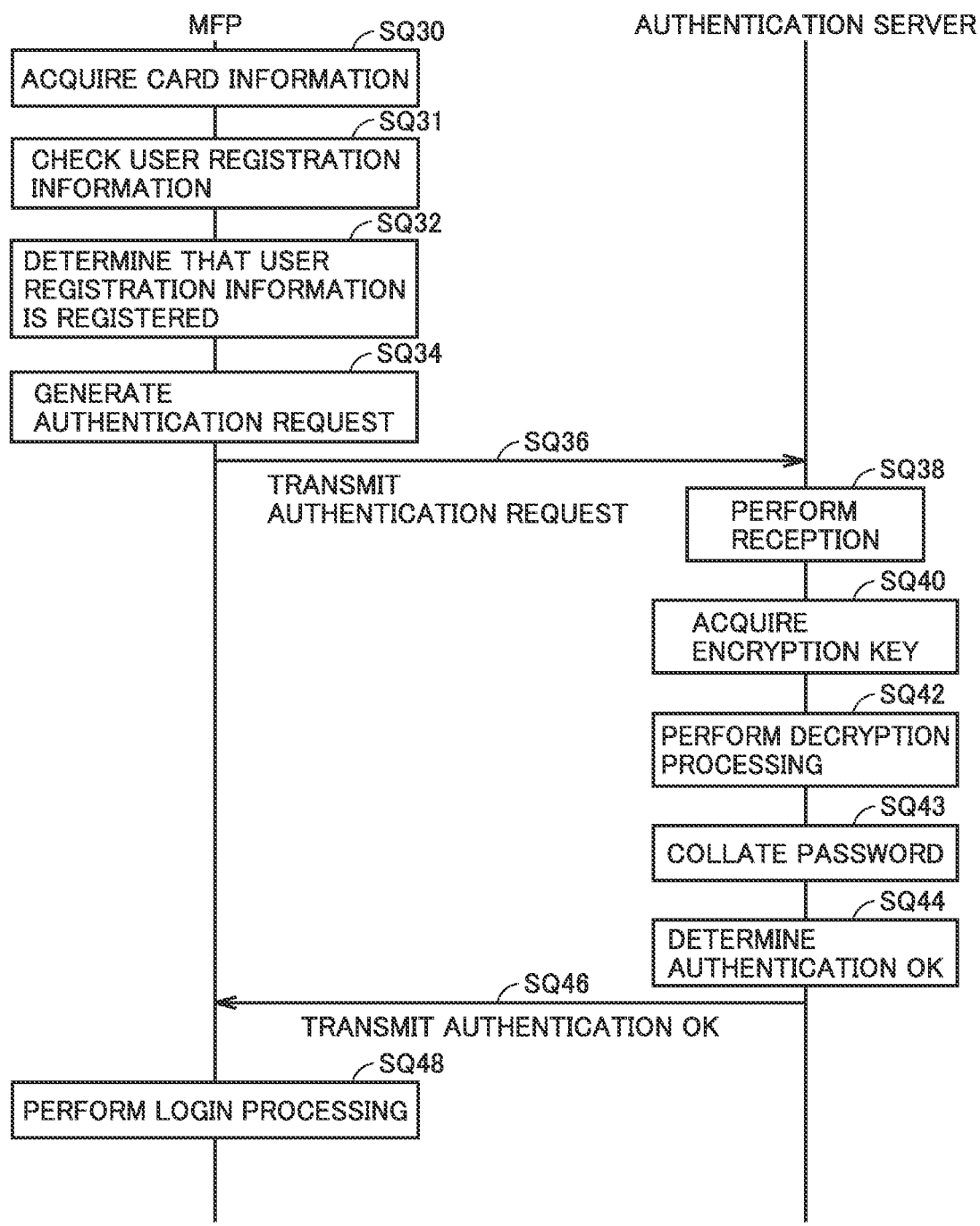
FIG. 17 is a view illustrating a data transfer flow during the authentication processing between the image forming apparatus 1 and the authentication server 100 of another embodiment.

FIG. 17 is a view illustrating a data transfer flow during the authentication processing between the image forming apparatus 1 and the authentication server 100 of another embodiment. In the example, the case where the user possessing the IC card is registered as the user will be described.

With reference to FIG. 17, IC card reader 22 acquires the card information (sequence SQ30). The user information acquisition unit 30 checks whether the user registration information stored in user registration information storage 38 can be acquired according to the card ID acquired through IC card reader 22 (sequence SQ31). In the example, user information acquisition unit 30 illustrates the case where the user registration information is registered in user registration information storage 38 according to the acquired card information (sequence SQ32). Subsequently, user information acquisition unit 30 instructs authentication request unit 32, and authentication request unit 32 generates the authentication request (sequence SQ34). Authentication request unit 32 transmits the user ID and the encrypted data to authentication server 100 as the authentication request. The encrypted data is obtained by encrypting the password using the private key.

Subsequently, authentication processing unit 102 receives the authentication request from image forming apparatus 1 (sequence SQ38).

Subsequently, authentication processing unit 102 acquires the encryption key according to the user ID included in the authentication request (sequence SQ40). Specifically, authentication processing unit 102 acquires the public key corresponding to the user ID from the authentication registration information stored in authentication registration information storage 108.

Subsequently, authentication processing unit 102 decrypts the encrypted data based on the acquired public key (sequence SQ42). Authentication processing unit 102 decrypts the password encrypted using the public key.

Authentication processing unit 102 collates whether the decrypted password and the password included in the authentication registration information are the same (sequence SQ43).

When determining that the collation results are matched with each other, authentication processing unit 102 determines the authentication OK (sequence SQ44).

Authentication processing unit 102 transmits an authentication OK notification to image forming apparatus 1 (sequence SQ46).

When receiving the authentication OK notification from authentication server 100, authentication request unit 32 notifies the login controller 34, and login controller 34 executes the login processing (sequence SQ48). Thus, the authentication processing is completed.

According to a method according to another embodiment, the data is exchanged using the password instead of the temporary key as the encrypted data. Then, the encryption key is generated for each user, and the authentication processing is executed based on the generated encryption key. Consequently, the secure authentication can be performed.

Furthermore, according to this method, when the authentication processing is performed using the IC card possessed by each user, the information about the IC card is not required to be transmitted to authentication server 100, but the information about the IC card can be kept in the secure state.

In the example, the user authentication method using the IC card has been described. However, the authentication method is not limited to the IC card, but the biological information can be similarly used instead of the IC card. The biological information may be registered instead of the card ID. In addition, not only the biological information but also, for example, a user authentication method using a PIN code can be similarly applied.

Although embodiments of the present invention have been described and illustrated in detail, the disclosed embodiments are made for purposes of illustration and example only and not limitation. The scope of the present invention should be interpreted by terms of the appended claims.

What is claimed is:

1. An authentication system comprising:
    an information processing apparatus including a first processor; and
    an authentication server connected to the information processing apparatus through a network and including a second processor, wherein
    the information processing apparatus includes a first memory that stores user registration information in which identification information identifying a user is associated with an encryption key set for each user, wherein the stored user registration information includes identification information and a unique associated encryption key for each of a plurality of users,
    wherein an expiration date is set in the encryption keys,
    the first processor is configured to:
        acquire the user registration information stored in the first memory based on an instruction operation of one of the plurality of users;
        generate an authentication request including a temporary key encrypted based on an encryption key included in the acquired user registration information and the identification information included in the acquired user registration information for the one of the plurality of users, wherein the temporary key was received from the authentication server during registration and is unique for each of the plurality of users; and
        transmit the authentication request to the authentication server, the authentication server includes a second memory that stores authentication registration information in which the identification information identifying the user registered in the information processing apparatus is associated with the encryption key and the temporary key set for each of the plurality of users, and
    the second processor is configured to:
        acquire the encryption key and the temporary key included in the authentication registration information in correspondence with the identification information included in the authentication request received from the information processing apparatus;
        decrypt the temporary key included in the authentication request that is encrypted based on the acquired encryption key; and
        transmit an authentication result to the information processing apparatus.

2. The authentication system according to claim 1, wherein
    the information processing apparatus further includes a card reader that acquires card information about a card possessed by a user, and
    the first processor acquires the user registration information stored in the first memory based on the card information acquired based on an instruction operation of the user to the card reader.

3. The authentication system according to claim 1, wherein
    the information processing apparatus further includes a sensor that acquires biological information about the user, and
    the first processor acquires the user registration information stored in the first memory based on the biological information acquired based on an instruction operation of the user to the sensor.

4. The authentication system according to claim 1, wherein the first processor acquires the user registration information stored in the first memory based on an input instruction operation of a code of the user.

5. The authentication system according to claim 1, wherein
    the information processing apparatus further includes a communication interface that receives the authentication result, and
    the first processor switches the information processing apparatus to a login state based on the authentication result received by the communication interface.

6. The authentication system according to claim 1, wherein
    the first processor registers the user registration information in the first memory for each user, and
    the second processor registers the authentication registration information in the second memory for each user.

7. The authentication system according to claim 6, wherein
    the first processor accepts a registration request including the identification information about the user and transmits the registration request to the authentication server,
    the second processor accepts the registration request, generates the temporary key, and transmits the temporary key to the information processing apparatus,
    the first processor receives the temporary key to generate the encryption key for each user, encrypts the temporary key based on the encryption key, and transmits the encrypted temporary key to the authentication server together with the encryption key, and the second processor decrypts the data encrypted based on the encryption key, and registers the authentication registration information in which the identification information and the encryption key are associated with each other based on a decryption result in the second memory.

8. The authentication system according to claim 7, wherein
the first processor generates a private key paired with a public key as the encryption key, encrypts the temporary key based on the private key, and transmits the encrypted temporary key to the authentication server together with the public key, and
the second processor decrypts the encrypted temporary key based on the public key, and registers the authentication registration information in which the identification information and the public key are associated with each other based on the decryption result in the second memory.

9. An authentication system comprising:
an information processing apparatus including a first processor; and
an authentication server connected to the information processing apparatus through a network and including a second processor, wherein
the information processing apparatus includes a first memory that stores user registration information in which identification information identifying a user is associated with an encryption key set for each user, wherein the stored user registration information includes identification information and a unique associated encryption key for each of a plurality of users, wherein an expiration date is set in the encryption keys,
the first processor is configured to:
　acquire the user registration information stored in the first memory based on an instruction operation of one of the plurality of users;
　generate an authentication request including a temporary key encrypted based on an encryption key included in the acquired user registration information and the identification information included in the acquired user registration information for the one of the plurality of users, wherein the temporary key was received from the authentication server during registration and is unique for each of the plurality of users; and
　transmit the authentication request to the authentication server,
the authentication server includes a second memory that stores authentication registration information in which the identification information identifying the user registered in the information processing apparatus is associated with the encryption key and the temporary key set for each of the plurality of users, and
the second processor is configured to:
　acquire the encryption key and the temporary key included in the authentication registration information in correspondence with the identification information included in the authentication request received from the information processing apparatus;
　decrypt the temporary key included in the authentication request that is encrypted based on the acquired encryption key;
　authenticate by determining whether the temporary key included in the authentication request matches the temporary key obtained from the second memory; and
　transmit an authentication result to the information processing apparatus;
wherein the first processor registers the user registration information in the first memory for each user, determines whether the encryption key included in the user registration information is within the expiration date, and re-registers the user registration information in the first memory for each user based on a determination result.

10. A method for controlling an authentication system including an information processing apparatus and an authentication server connected to the information processing apparatus through a network, the method comprising:
　storing user registration information in which identification information identifying a user is associated with an encryption key set for each user, wherein the stored user registration information includes identification information and a unique associated encryption key for each of a plurality of users, wherein an expiration date is set in the encryption keys;
　acquiring the user registration information stored in the first memory based on an instruction operation of one of the plurality of users;
　generating an authentication request including a temporary key encrypted based on an encryption key included in the acquired user registration information and the identification information included in the acquired user registration information for the one of the plurality of users, wherein the temporary key was received from the authentication server during registration and is unique for each of the plurality of users, and
　transmitting the authentication request to the authentication server;
　storing authentication registration information in which the identification information identifying the user registered in the information processing apparatus is associated with the encryption key and the temporary key set for each of the plurality of users;
　acquiring the encryption key and the temporary key included in the authentication registration information in correspondence with the identification information included in the authentication request received from the information processing apparatus; and
　decrypting the temporary key included in the authentication request that is encrypted based on the acquired encryption key and transmitting an authentication result to the information processing apparatus.

* * * * *